(No Model.)  2 Sheets—Sheet 1.
F. BAUGH & W. MURPHY.
MACHINE FOR SHEARING RAILWAY TIES.
No. 546,574.  Patented Sept. 17, 1895.
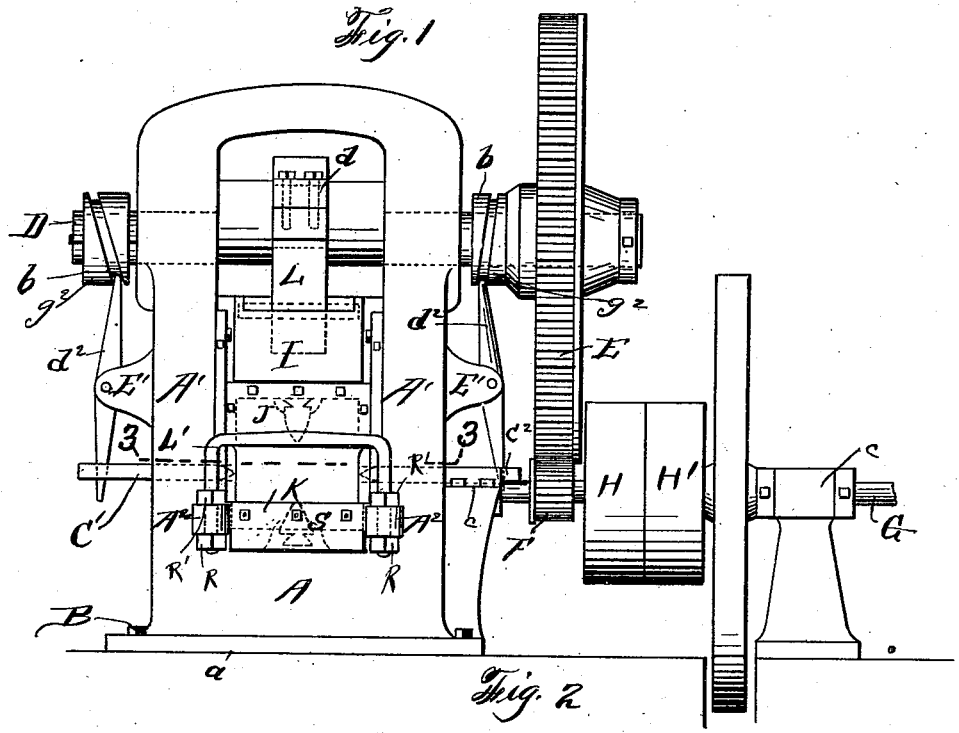
Fig. 1
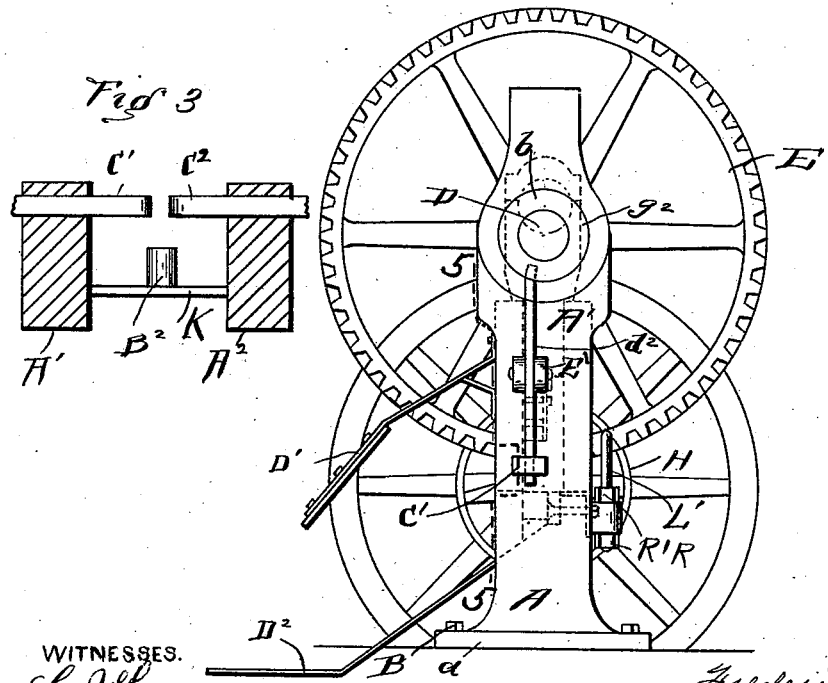
Fig. 3
Fig. 2
WITNESSES.
C. J. Cross.
INVENTORS:
Frederick Baugh
William Murphy
By Fred W. Bond
Attorney.

(No Model.) 2 Sheets—Sheet 2.

F. BAUGH & W. MURPHY.
MACHINE FOR SHEARING RAILWAY TIES.

No. 546,574. Patented Sept. 17, 1895.

WITNESSES.
 Cross
 Edde Smith

INVENTORS
 Frederick Baugh
 William Murphy
 By Fred W Bond
 Attorney.

UNITED STATES PATENT OFFICE.

FREDERICK BAUGH AND WILLIAM MURPHY, OF ALLIANCE, OHIO, ASSIGNORS TO JOHN C. DEVINE, OF SAME PLACE.

MACHINE FOR SHEARING RAILWAY-TIES.

SPECIFICATION forming part of Letters Patent No. 546,574, dated September 17, 1895.

Application filed October 18, 1894. Serial No. 526,316. (No model.)

*To all whom it may concern:*

Be it known that we, FREDERICK BAUGH and WILLIAM MURPHY, citizens of the United States, residing at Alliance, in the county of Stark and State of Ohio, have invented certain new and useful Improvements in Machines for Shearing Wooden Railway-Ties; and we do hereby declare that the following is a full, clear, and exact description of the same, reference being had to the annexed drawings, making a part of this specification, and to the letters of reference marked thereon, in which—

Figure 4:
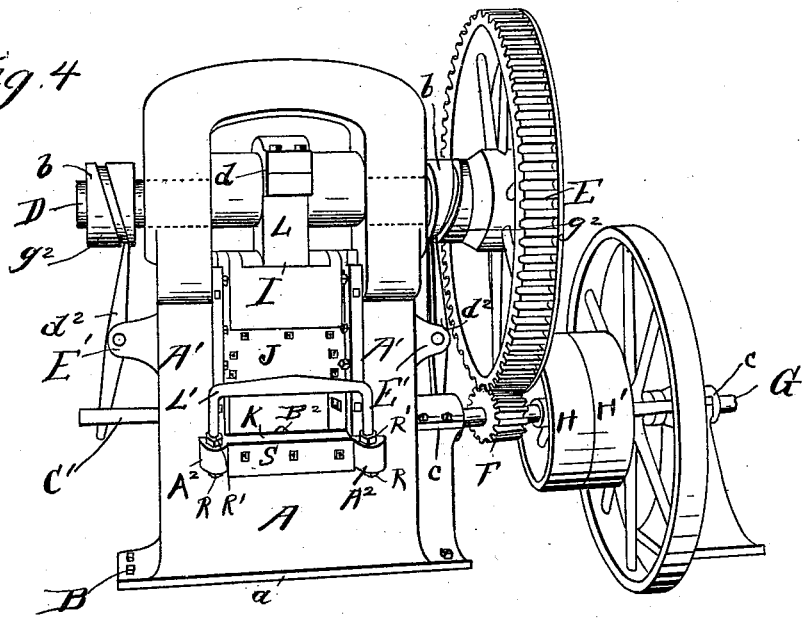
Figure 5:
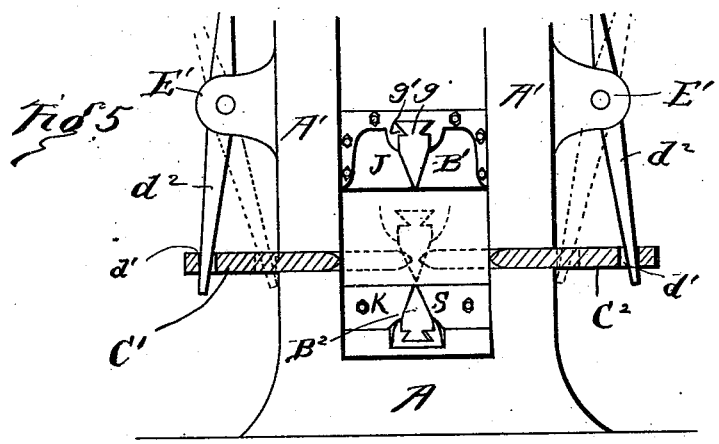
Figure 6:
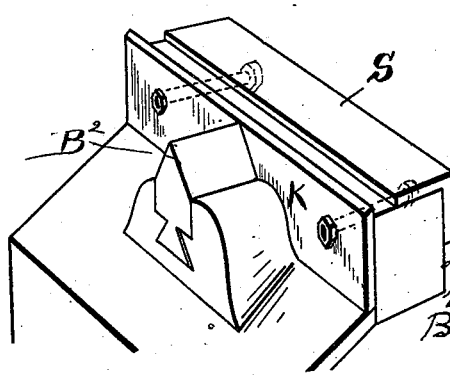

Figure 1 is a side elevation. Fig. 2 is a left-hand side elevation relative to Fig. 1. Fig. 3 is a view illustrating the arrangement of the splitting knives or blades. Fig. 4 is a perspective view. Fig. 5 is a view showing the position of the cutting and splitting knives, illustrating the splitting-knives moved outward. Fig. 6 is a detached view of the lower or fixed cutting and splitting knives.

The present invention has relation to machines for shearing wooden railway-ties; and it consists in the different parts and combination of parts hereinafter described, and particularly pointed out in the claim.

Similar letters of reference indicate corresponding parts in all of the figures of the drawings.

In the accompanying drawings, A represents the upright frame, which is substantially of the form shown and is flanged laterally at its lower end, as at $a$, for the reception of bolts B, that secure the supporting structure or frame to the floor or other suitable foundation of the shop. A horizontally-arranged crank-shaft D has suitable bearings in the upper portion of the frame A, the crank $d$ of said shaft being located between the side members A' of the frame A. The shaft D extends through a suitable distance outside of the members A', so that the gear-wheel E can be mounted upon said shaft, together with the cam-wheels $b$, said cam-wheels being located substantially as shown in the drawings and are for the purpose hereinafter described. The gear-wheel E meshes with the pinion F, which pinion is operatively mounted upon the driving-shaft G, which driving-shaft is provided with the tight and loose pulleys H and H'. The shaft G is properly journaled in the boxes $c$. The plunger I is suitably connected to the crank $d$ by means of the pitman L, by which arrangement the plunger I is moved up and down by the rotation of the shaft D and its crank.

To the plunger I is attached in any convenient and well-known manner the cutting blade or shear J, and in the operation of the machine the knife or shear J is adapted to co-operate with the stationary shear or die K, which die is securely attached in any convenient and well-known manner to the frame A or its equivalent. The tie to be sheared is fed in between the members A' A' of the supporting structure, between the two shears, the tie during the cutting operation being held or placed upon the lower or stationary shear or die and held against upward displacement by means of a bail-shaped guide L'. The end members of said guide are screw-threaded and extended through holes in ears or lugs $A^2$ of the supporting structure, said guide being adjustable vertically and secured in the desired adjustment by means of nuts R and R', mounted upon the screw-threaded end members of the guide at opposite sides of the lugs.

For the purpose of splitting the tie longitudinally the wedge-shaped blades B' and $B^2$ are provided and are located at right angles to the shears J and K. The blade B' is attached to the plunger I by means of its dovetailed extension $g$ and the dovetailed groove $g'$. The blade $B^2$ is attached in the same manner to the frame or structure of the machine proper.

For the purpose of providing for splitting the tie horizontally the reciprocating blades C' and $C^2$ are provided, which blades are located substantially as shown in Fig. 5, and, as shown, they are passed through openings formed in the side members A'. The outer ends of the reciprocating blades C' and $C^2$ are each provided with the apertures $d'$, through which apertures are passed the bottom or lower ends of the levers $d^2$, said levers being pivotally attached to the extensions E', which extensions are preferably formed integral with the members A' A'. The levers $d^2$ extend upward, and their top or upper ends engage with the cams $g^2$, which cams are formed upon the peripheries of the wheels $b$ and are curved, so as to impart a rocking movement to the levers $d^2$ as the wheels $b$ rotate.

In the drawings we have illustrated but one lower and one upper splitting-blade; but it will be understood that more splitting-blades may be added without departing from the nature of our invention, inasmuch as the additional blades are to be attached in the same manner as that of the ones shown.

For the purpose of providing for the edges of the shears J and K passing each other the lower shear or die is set up above the bed a short distance, as illustrated in Fig. 6, and for the purpose of providing a proper support for the tie during the time it is cut the bar S may be provided, which bar is located substantially as shown in Fig. 6.

It will be understood that the splitting-blades $B'$, $B^2$, $C'$, and $C^2$ should be so arranged with reference to each other that they will not come in contact during their operation—that is to say, the horizontal blades should be located a little to one side of the vertical blades.

For the purpose of gaging the length of the tie or timber to be cut the bar $D'$ is provided, which bar is located as illustrated in Fig. 2 and is securely attached to the frame A or its equivalent.

The bar $D^2$ or plate is for the purpose of receiving the portion of the tie or timber cut off and is located substantially as shown in Fig. 2.

For the purpose of giving to the supporting structure strength we prefer to form the upright portion thereof O-shaped.

Having fully described our invention, what we claim as new, and desire to secure by Letters Patent, is—

In a machine of the variety indicated, the combination of the supporting frame provided with the crank-shaft D having mounted thereon the gear wheel E, a driving shaft provided with a pinion meshing with the gear E, the cam wheels $b$, provided with the cams $g^2$, the levers $d^2$, pivotally attached to the reciprocating cutting-blades $C'$ and $C^2$, and operatively connected with the cam wheels $b$, the shears J and K, and means for imparting a vertically reciprocating motion to the blade J, substantially as and for the purpose specified.

In testimony that we claim the above we have hereunto subscribed our names in the presence of two witnesses.

FREDERICK BAUGH.
WILLIAM MURPHY.

Witnesses:
L. I. RICKARD,
J. W. CRAINE.